(12) United States Patent
Li et al.

(10) Patent No.: US 7,791,820 B2
(45) Date of Patent: Sep. 7, 2010

(54) RETRACTABLE ZOOM LENS

(75) Inventors: Zi-Yuan Li, Guangdong (CN); Bin Lei, Guangdong (CN); Long-Liang Zou, Guangdong (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/428,446

(22) Filed: Apr. 22, 2009

(65) Prior Publication Data
US 2010/0128365 A1 May 27, 2010

(30) Foreign Application Priority Data
Nov. 21, 2008 (CN) .................. 2008 1 0305680

(51) Int. Cl.
*G02B 15/14* (2006.01)
(52) U.S. Cl. .................. 359/694; 359/700; 359/701

(58) Field of Classification Search ......... 359/694–701, 359/704, 738–740, 811–824; 396/73
See application file for complete search history.

(56) References Cited

U.S. PATENT DOCUMENTS

| 6,853,500 | B2 * | 2/2005 | Nomura et al. | ............. 359/695 |
| 7,527,438 | B2 * | 5/2009 | Nomura et al. | ............. 396/349 |
| 2006/0274430 | A1 * | 12/2006 | Nomura et al. | ............. 359/704 |

* cited by examiner

*Primary Examiner*—Mohammed Hasan
(74) *Attorney, Agent, or Firm*—Zhigang Ma

(57) ABSTRACT

A retractable zoom lens includes a holder, at least one movable barrel assembly received in the holder, a holding frame received in the movable barrel assembly, and a slide barrel engaged with the holding frame. The holding frame can move along the optical axis along with the movement of the movable barrel assembly. The movable barrel assembly is movable along an optical axis of the retractable zoom lens, and the slide barrel is slidable along a direction substantially perpendicular to the optical axis during an object image captured by an image pickup device of the retractable zoom lens.

20 Claims, 8 Drawing Sheets

RETRACTABLE ZOOM LENS

BACKGROUND

1. Technical Field

The present invention relates to a zoom lens and, particularly, to a retractable zoom lens.

2. Description of Related Art

The photography apparatuses (hereinafter, cameras) are trendily designed as compact as possible for their portability. Among members constituting such a camera, a retractable zoom lens constitutes a large portion of the camera in terms of volume and weight. However, generally, the retractable zoom lens can only move along the optical axis of a photographic optical system of the camera for achieving zooming in/zooming out. As a result, the configuration of such a retractable zoom lens is always bulky and heavy which often undercuts the efforts in miniaturization of the camera.

Therefore, it is desirable to provide a retractable zoom lens with a compact structure.

BRIEF DESCRIPTION OF THE DRAWINGS

Many aspects of the present retractable zoom lens should be better understood with reference to the following drawings. The components in the drawings are not necessarily drawn to scale, the emphasis instead being placed upon clearly illustrating the principles of the present retractable zoom lens. Moreover, in the drawings, like reference numerals designate corresponding parts throughout the several views.

DETAILED DESCRIPTION

Embodiments of the present retractable zoom lens will be now described in detail with reference to the drawings.

Figure 1:
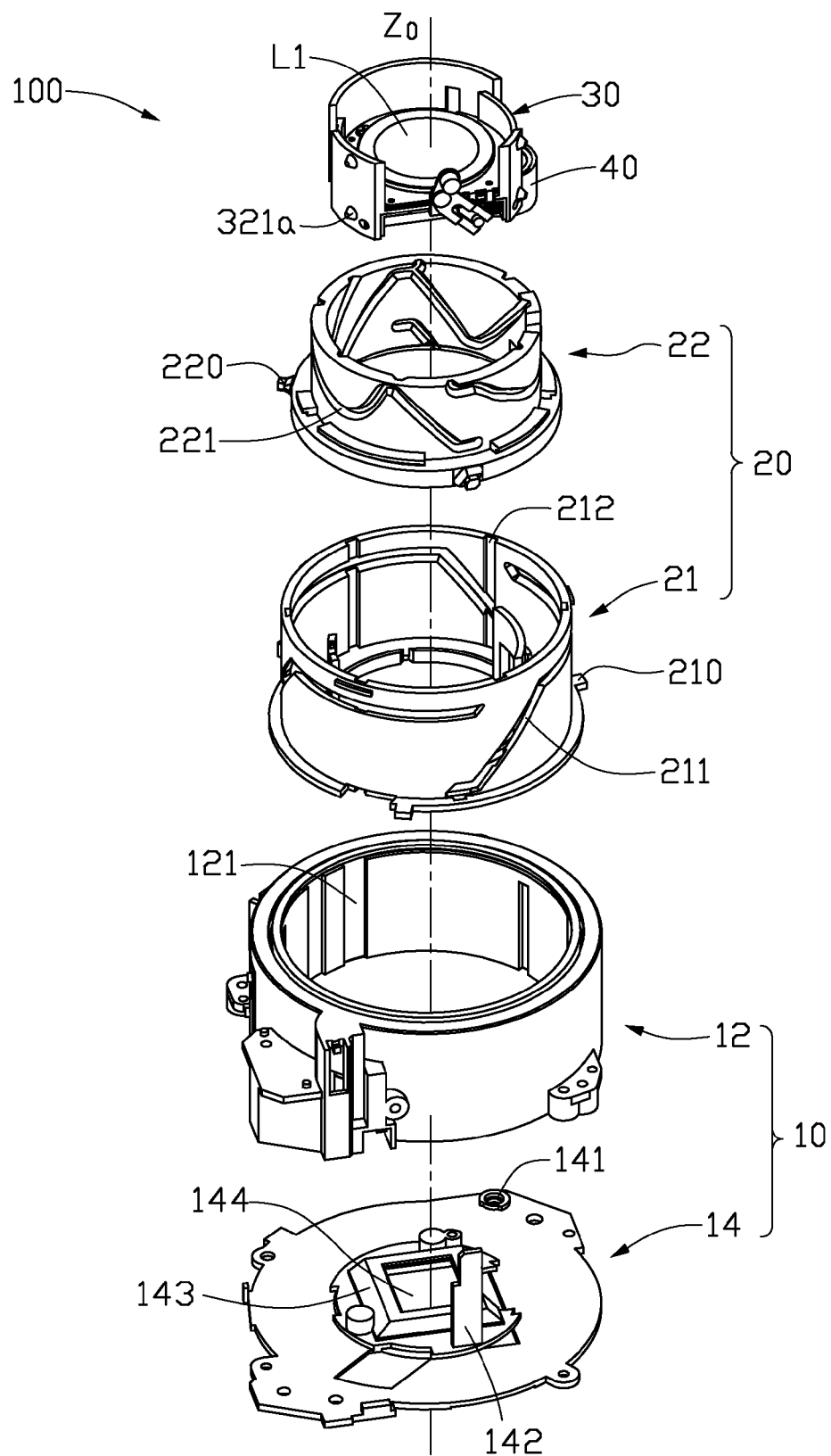
FIG. 1 is an isometric, exploded view of a retractable zoom lens, according to an exemplary embodiment.

Referring to FIG. 1, a retractable zoom lens 100 according to an exemplary embodiment, includes a holder 10, at least one movable barrel assembly 20 received in the holder 10, a holding frame 30 received in the movable barrel assembly 20, and a slide barrel 40 engaged with the holding frame 30. The movable barrel assembly 20 is movable along an optical axis Z0 of the retractable zoom lens 100, and the slide barrel 40 is slidable along a direction substantially perpendicular to the optical axis Z0.

The holder 10 is configured for holding the movable barrel assembly 20 and receiving an image pickup device (not shown). The center of the image pickup device is formed on the optical axis Z0 for sensing light transmitted from a number of lens groups received in the movable barrel assembly 20. In this embodiment, the retractable zoom lens 100 includes a first lens group L1 and a second lens group L2 (shown in FIG. 2). An object image formed by the first and second lens groups L1, L2 can be brought into focus and captured by the image pickup device by the first and second lens groups L1, L2 moving along the optical axis Z0.

The holder 10 includes a stationary barrel 12 and a substrate 14 fixed to the bottom of the stationary barrel 12. In this embodiment, the stationary barrel 12 has a cylinder-shaped configuration. The stationary barrel 12 is configured for receiving the movable barrel assembly 20 and driving the movable barrel assembly 20 to move along the optical axis Z0 of the retractable zoom lens 100. The inner side surface of the stationary barrel 12 defines a number of guide slots 121 parallel to the optical axis Z0. In this embodiment, the edge of the substrate 14 defines several screws 141 for fixing the stationary barrel 12 on the substrate 14 by bolts (not shown). The substrate 14 defines a bar-strip-shaped leg portion 142 extending upward from a top surface of the substrate 14 thereof. The leg portion 142 is received in the stationary barrel 12 and substantially formed parallel to the optical axis Z0. An end of the leg portion 142 has an arc-shaped configuration. The substrate 14 further includes a flange 143 formed on the middle portion thereof. The flange 143 defines a receiving groove 144 at the center thereof for receiving the image pickup device thereon. In an alternative embodiment, the substrate 14 can be integrated with the stationary barrel 12.

The movable barrel assembly 20 includes a first barrel 21 and a second barrel 22 received in the first barrel 21. The first barrel 21 includes a number of protrusions 210 protruding outward from the bottom portion of the outer surface thereof to engage with the corresponding guide slots 121 of the stationary barrel 12. The first barrel 21 can be moved along optical axis Z0 when the guide slots 121 and the protrusions 210 are engaged with each other. The first barrel 21 defines a number of first through cam grooves 211 formed on the sidewall thereof, and a number of vertical grooves 212 formed on the inner side thereof. The second barrel 22 includes a number of cam pins 220 corresponding to the first through cam grooves 211. The second barrel 22 can be rotated relative to the first barrel 21 when the first barrel 21 moving along the optical axis Z0. The second barrel 22 defines a number of second cam grooves 221 on the outer side thereof. The leg portion 142 of the holder 10 is received in the second barrel 22 and substantially parallel to the optical axis Z0.

Referring to FIGS. 1-4, the holding frame 30 is received in the second barrel 22 of the movable barrel assembly 20. The holding frame 30 includes a base 32, a bracket 33 engaged with the base 32, a pusher 34 connected to the bracket 33 and an engaging pin 35 engaged with the bracket 33 and the pusher 34. The first lens group L1 is received in the holding frame 30 (seen in FIG. 1).

The base 32 includes a body 320, an arc-shaped sidewall 321 extending from an edge of the body 320, and a recess 322 formed between the body 320 and the arc-shaped sidewall 321. The body 320 defines a light hole 320a at the center thereof, and a contacting surface 323 formed on a bottom thereof to face the substrate 14 of the holder 10. The contacting surface 323 defines a guiding groove 323a along a radial direction of the base 32 for guiding the slide barrel 40 to move along the radial direction perpendicular to the optical axis Z0. Both the center of the light hole 320a and the center of the slide barrel 40 are positioned at the optical axis Z0 when the retractable zoom lens 100 is in use. When the lens 100 is not in use it is stored adjacent to the optical axis as detailed below in paragraph 0027. The base 32 further includes a protruding portion 324 extending from the contacting surface 323. The protruding portion 324 defines a first hole 324a therein.

Figure 6:
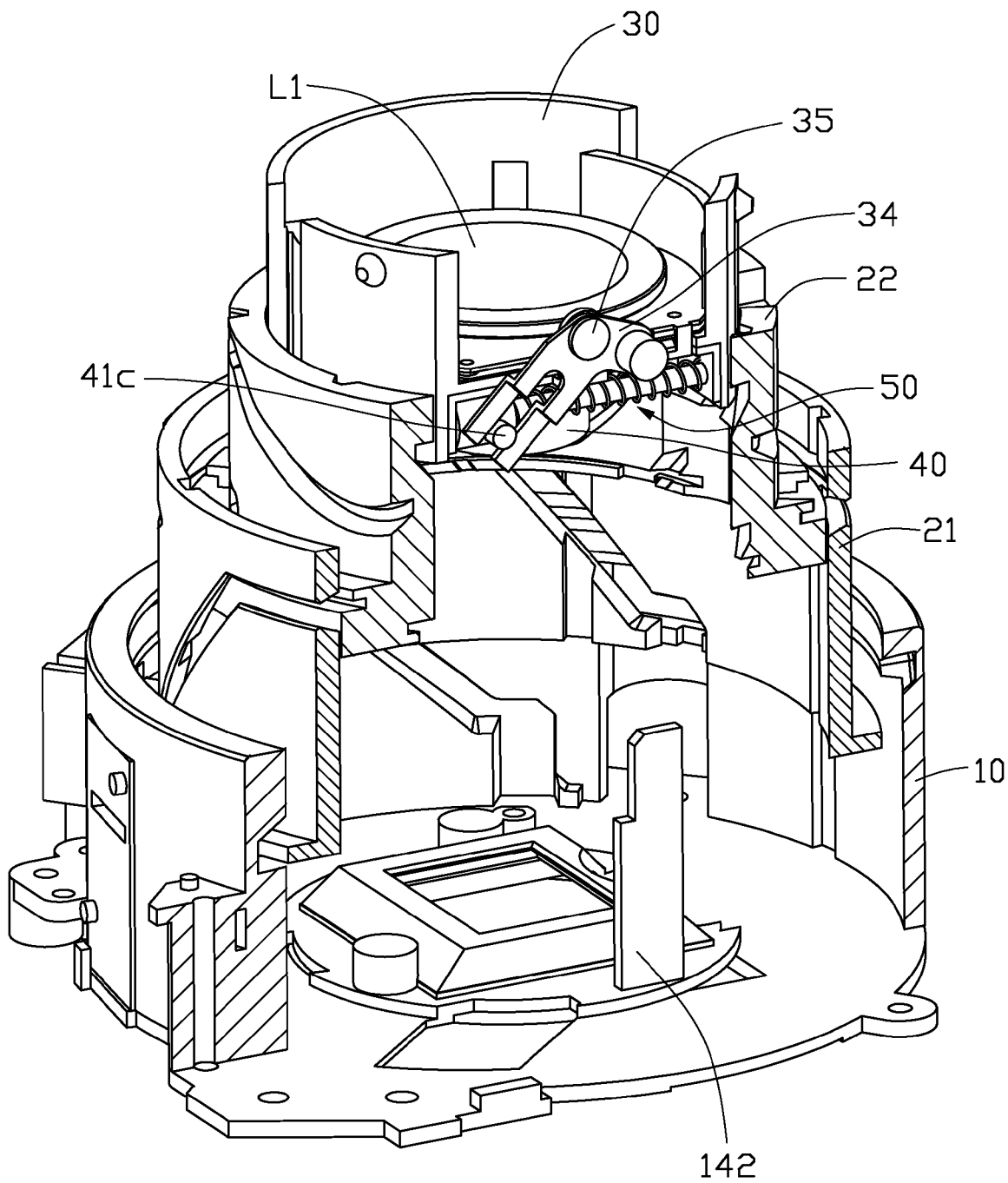
FIG. 6 is similar to FIG. 5, but showing the retractable zoom lens in the longest focal length position.
Figure 7:
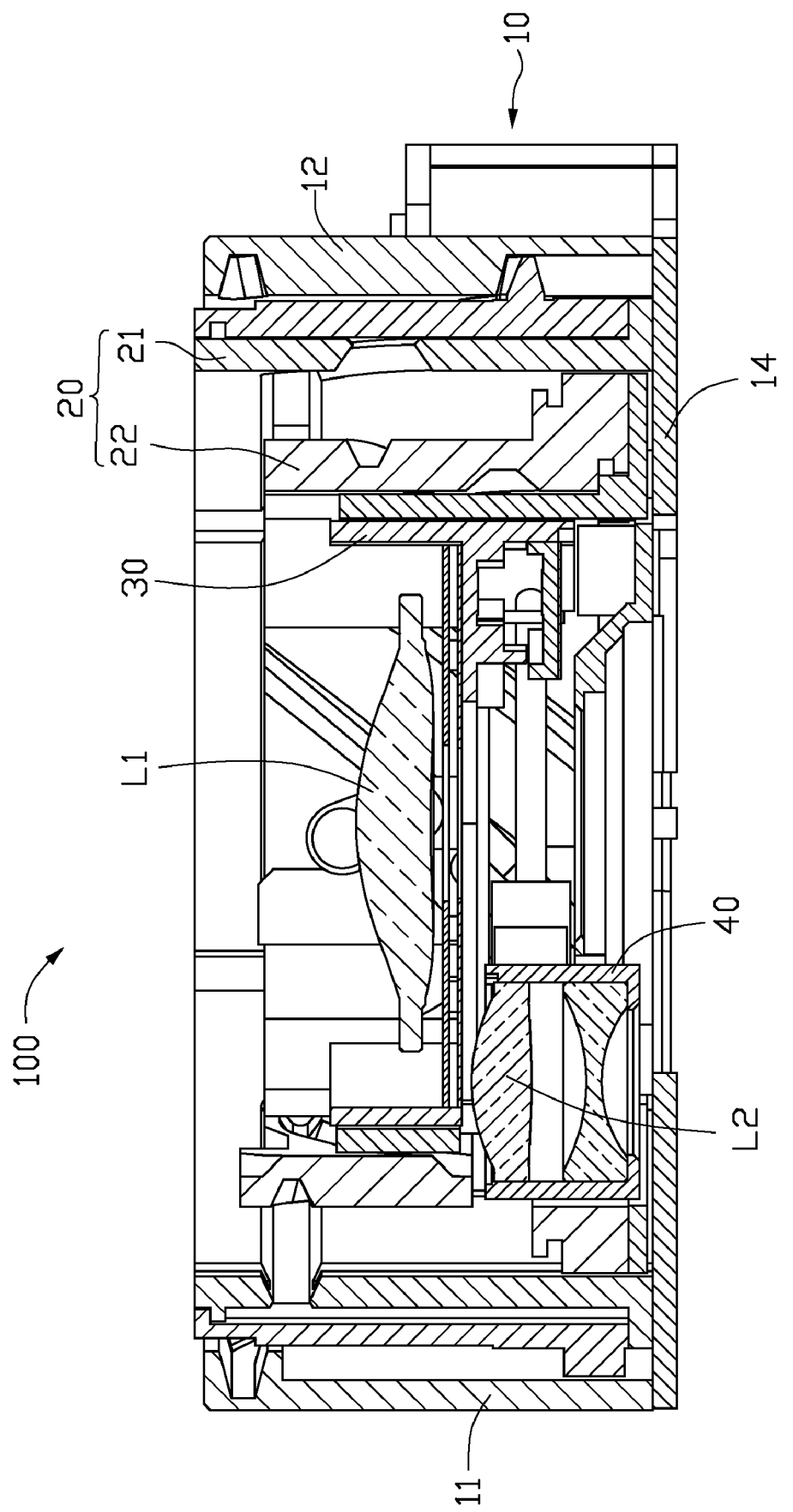
FIG. 7 is a schematic sectional view of the retractable zoom lens in the shortest focal length position.
Figure 8:
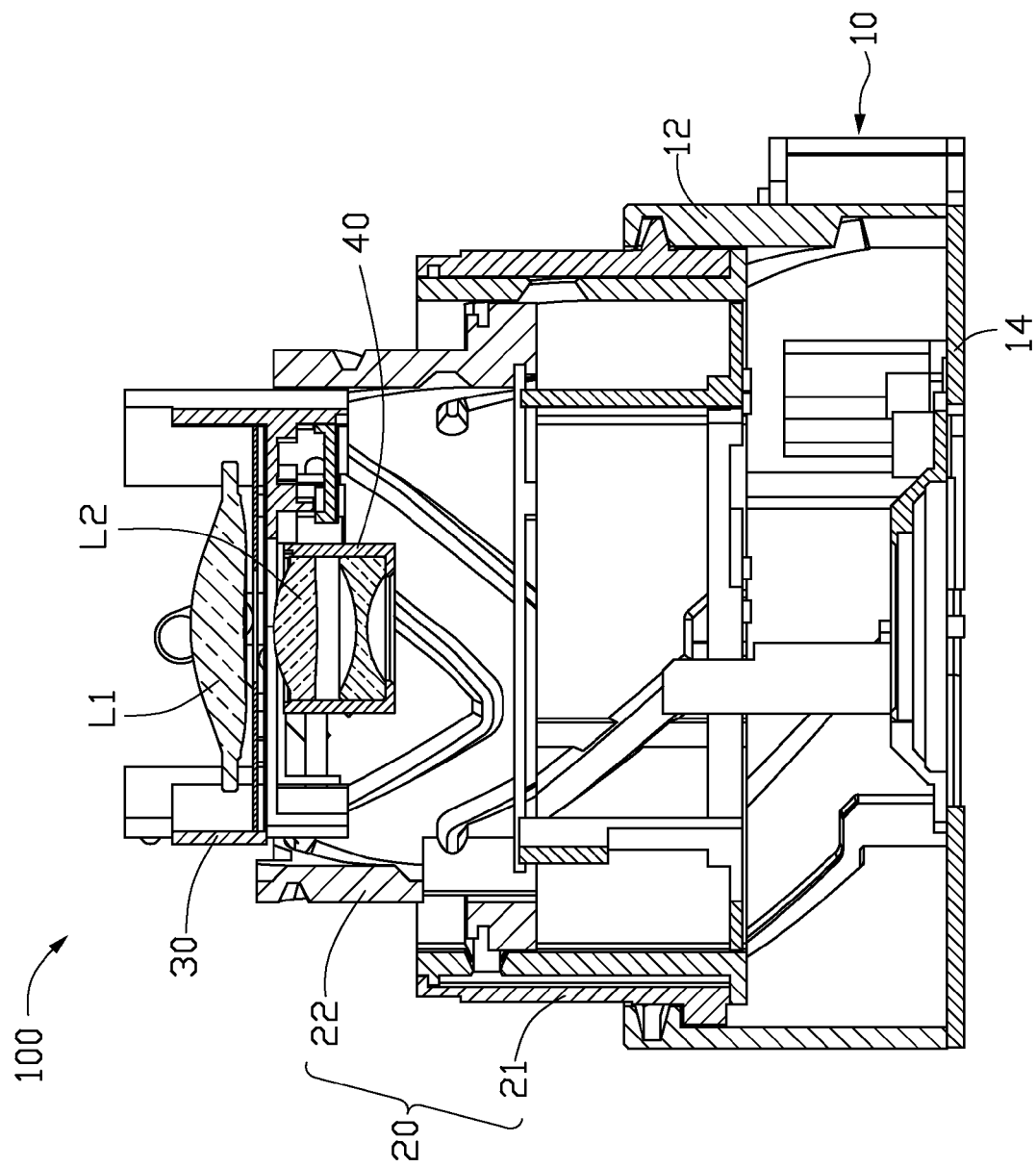
FIG. 8 is a schematic sectional view of the retractable zoom lens in the longest focal length position.

The sidewall 321 defines, at two lateral sides adjacent to the recess 322, respectively, two pairs of bars 321a and two first openings 321b adjacent to the recess 322. The two pairs of bars 321a are received in the corresponding vertical grooves 212 and passed through the second cam grooves 221. When the second barrel 22 is rotated, the bars 321a can be limited in the vertical grooves 212 and the holding frame 30 can move along the optical axis Z0. The sidewall 321, the contacting surface 323, and the substrate 14 of the holder 10 cooperatively define a vacant space 50 (seen in FIG. 6) for receiving the slide barrel 40 therein. The sidewall 321 further defines a second opening 321c corresponding to the first hole 324a.

The bracket 33 is received in the recess 322. The bracket 33 includes a supporting board 331, two legs 332 extending downward from two opposite ends of the supporting board 331, and a projecting portion 333 extending upward from a middle portion of the supporting board 331. The supporting board 331 is contacted to the contacting surface 323. Each leg 332 defines a through hole 332a corresponding to the first openings 321b. The projecting portion 333 defines a first positioning hole 333a thereof.

The pusher 34 includes a claw-shaped body 340 and a first ejector pin 341 fixed on an end of the claw-shaped body 340. The first ejector pin 341 is extended outwardly along the radial direction of the holding frame 30. The leg portion 142 can resist against the first ejector pin 341 when the retractable zoom lens 100 retracts from the longest focal length position to the shortest focal length position. The claw-shaped body 340 defines a second positioning hole 342 corresponding to the first positioning hole 333a and, a cutout 343 formed opposite to the second positioning hole 342. The edge of the cutout 343 is adjacent to the second positioning hole 342. The pusher 34 is engaged with the bracket 33 by the engaging pin 35 inserted through the first positioning hole 333a and the second positioning hole 342. Therefore, the pusher 34 can be rotated around the engaging pin 35.

The slide barrel 40 is received in the movable barrel assembly 20 by the holding frame 30. The second lens group L2 is received in the slide barrel 40. The slide barrel 40 is a ring-shaped configuration and the diameter of the slide barrel 40 is smaller than that of the second barrel 22. The slide barrel 40 includes a first base portion 41, a second base portion 42, a first guiding shaft 43 mounted on the first base portion 41, a spring 44 sleeved on the first guiding shaft 43, and a second guiding shaft 45 mounted on the second base portion 42.

The first base portion 41 extends outward from the outer periphery of the slide barrel 40, and the second base portion 42 is formed opposite to the first base portion 41. A cylindrical pivot 41a is formed on a distal end of the first base portion 41, while an arc-groove 42a is formed on a distal end of the second base portion 42. The axis of the pivot 41a is substantially perpendicular to the axis of the slide barrel 40. The pivot 41a defines a pivot hole 41b through the pivot 41a along the axis thereof, and a second ejector pin 41c extending outward from the outer surface thereof along a radial direction perpendicular to the optical axis Z0 of the retractable zoom lens 100. The second ejector pin 41c is received in the cutout 343 of the pusher 34 and can be moved along the cutout 343 by action of the claw shaped body 340. The first guiding shaft 43 runs through the pivot hole 41b, while the second guiding shaft 45 is engaged with the arc-groove 42a.

In assembly, two opposite ends of the first guiding shaft 43 are respectively received in the through holes 332a and the first openings 321b. Two opposite ends of the second guiding shaft 45 are respectively received in the second opening 321c of the sidewall 321 through the first hole 324a of the base 320. Therefore, the slide barrel 40 can be moved along the first guiding shaft 43 and the second guiding shaft 45 relative to the base 32 by being engaged with the bracket 33, which is fixed on the base 32.

Referring to FIG. 1 and FIGS. 5-8, when retracting the retractable zoom lens 100 from the longest focal length position to the shortest focal length position, the first barrel 21 is driven to move along the optical axis Z0 by a motor (not shown) firstly. The second barrel 22 is closed to the holder 10 with the rotation of the first barrel 21. The holding frame 30 is driven to retract along the optical axis Z0 by the rotation of the second barrel 22. At the same time, the first ejector pin 341 of the pusher 34 tends to maintain contact with the leg portion 142 according to the movement of the holding frame 30. The holding frame 30 is kept moving until the first ejector pin 341 resists on the leg portion 142.

Figure 2:
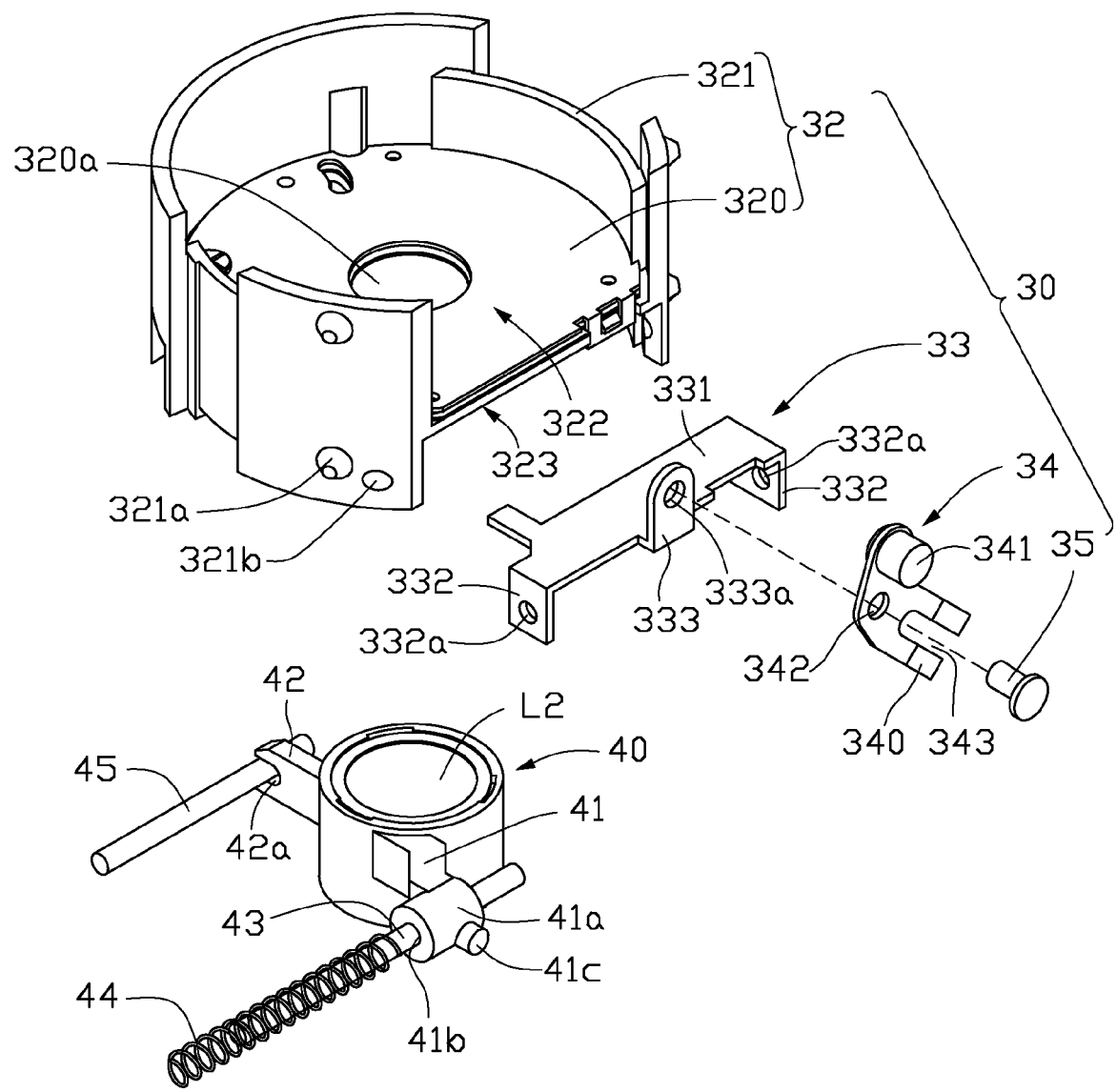
FIG. 2 is an isometric, exploded view of a holding frame and a slide barrel of the retractable zoom lens of FIG. 1.
Figure 3:
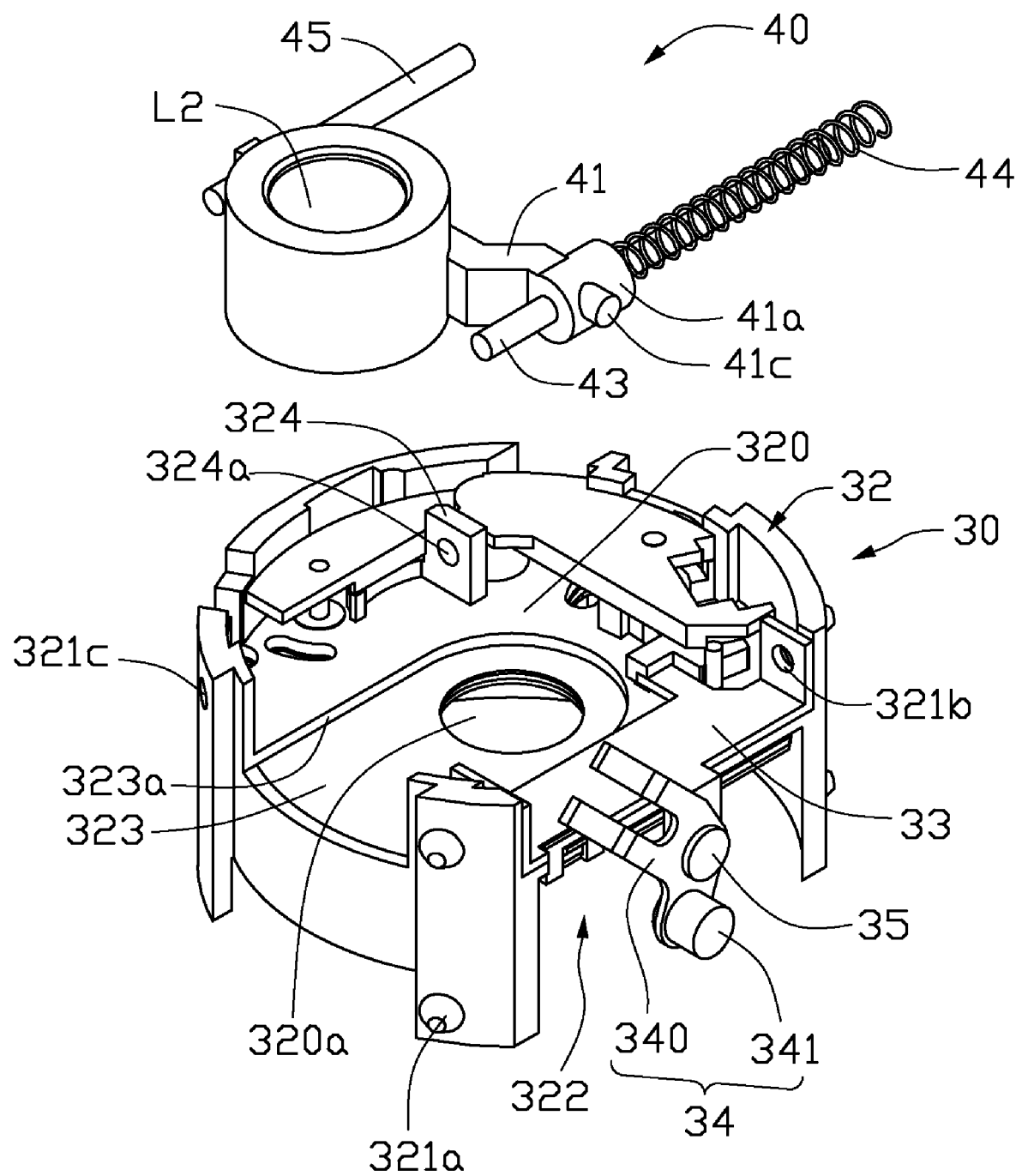
FIG. 3 is an inverted view of the holding frame and the slide barrel of FIG. 2.
Figure 4:
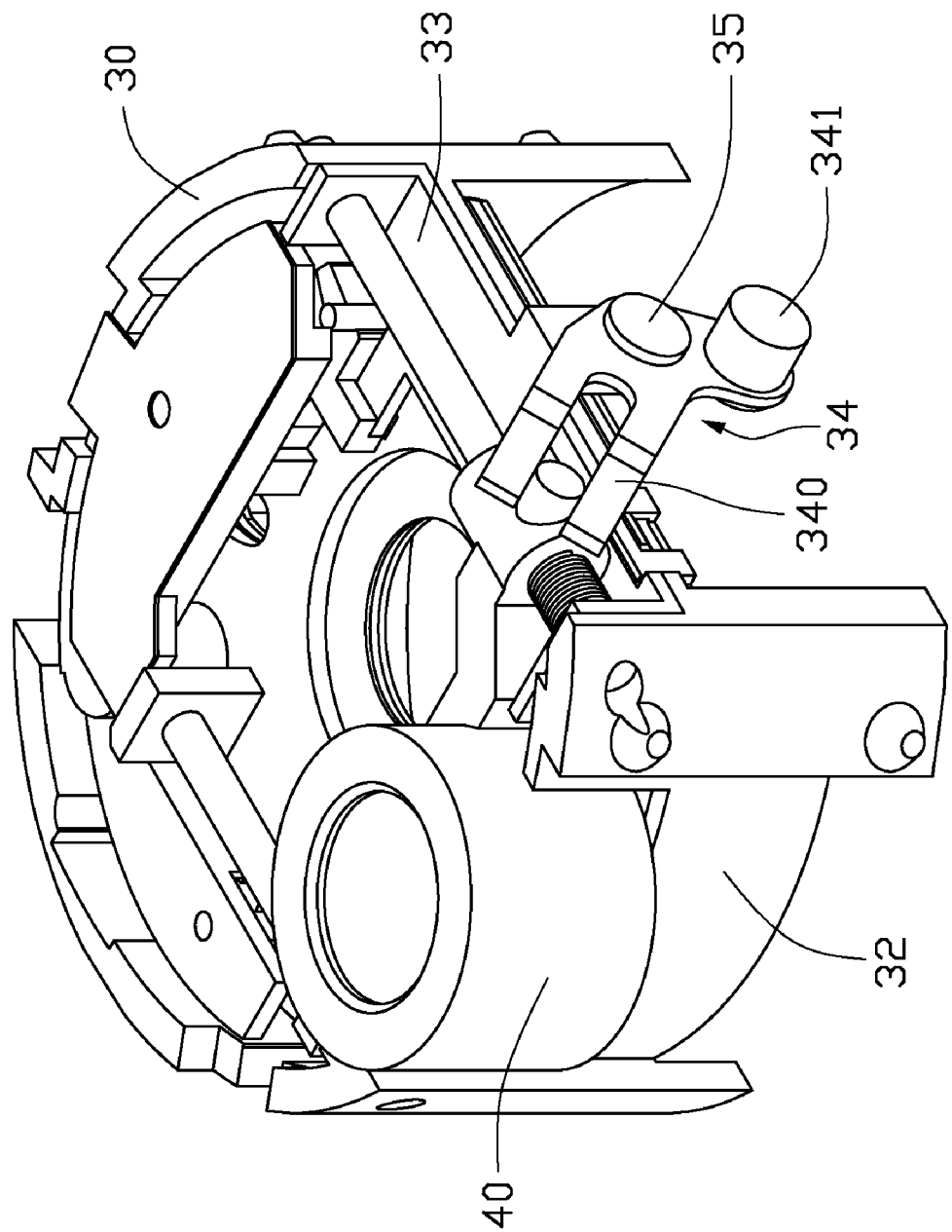
FIG. 4 is an isometric, assembly view of the holding frame and the slide barrel of FIG. 2.
Figure 5:
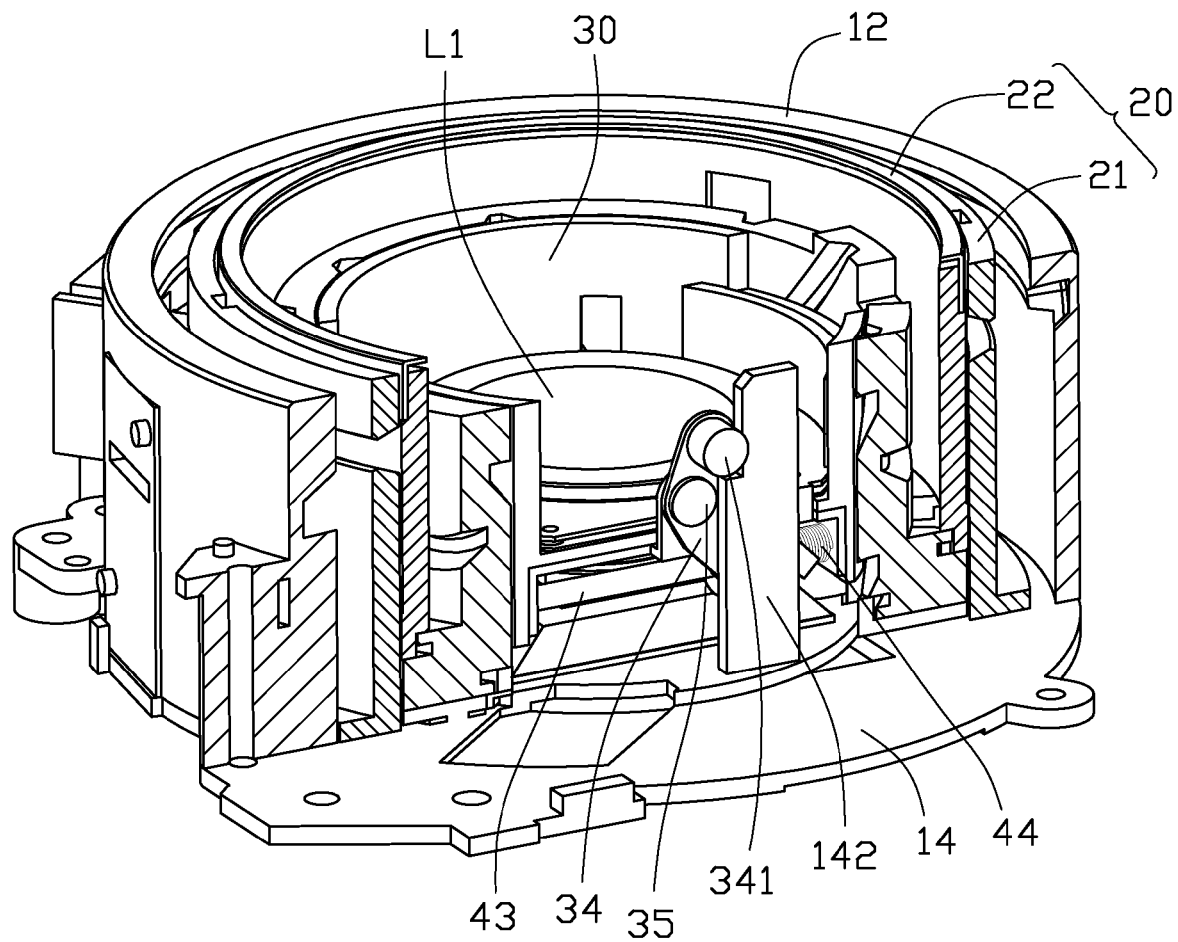
FIG. 5 is an isometric, cross-sectional view of the retractable zoom lens in the shortest focal length position.

When the first ejector pin 341 resists on the leg portion 142, the leg portion 142 forces the pusher 34 to rotate around the engaging pin 35 (seen in FIG. 2). The pusher 34 can drive the pivot 41a to move along the first guiding shaft 43 to press the spring 44. The spring 44 can reduce the movement speed of the pivot 41a to avoid breaking the slide barrel 40 off. With a pulling power of the pivot 41a, the slide barrel 40 can be slid along the guiding groove 323a (seen in FIG. 3) to far away from the light hole 320a (seen in FIG. 2). In this embodiment, the slide barrel 40 is stopped at the edge of the contacting surface 323 (seen in FIG. 3) and lastly received between the inner side surface of the second barrel 22 and the outer side surface of the flange 143 of the holder 10. Meanwhile, the flange 143 can slide into the vacant space 50.

When the slide barrel 40 is stopped, the end of the leg portion 142 is deviated from the first ejector pin 341. The leg portion 142 can continue to move until the flange 143 abuts against the contacting surface 323. The leg portion 142 keeps the first ejector pin 341 at stationary state after deviating from the first ejector pin 341, so that the pusher 34 is stopped and cannot be rotated. Consequently, the slide barrel 40 is stopped parallel to the image pickup device. Meanwhile, the first lens group L1 is moved along the optical axis Z0 following the movement of the holding frame 30 and the second lens group L2 slides along a direction perpendicular to the optical axis Z0 out of the way of the first lens group L1, coming to rest adjacent to the first lens group L1 side by side. Thus, the overall length of the retractable zoom lens 100 can be reduced.

Accordingly, in case of a multiple lens group arrangement, at least one lens group can be moved away from the optical axis Z0 and stored adjacent to the first lens group L1 side by side. That is, the arrangement gives a long focal length when both lens groups are aligned, but a short overall length when the lens groups are stored side by side, achieving a thin zoom lens 100 when retracted.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A retractable zoom lens comprising:
a holder comprising a stationary barrel and a substrate fixed to the bottom of the stationary barrel and defining a leg portion extending upward from a top surface of the substrate;

a movable barrel assembly received in the stationary barrel and being movable along an optical axis of the retractable zoom lens;

a holding frame received in the movable barrel assembly and movable along the optical axis together with the movable barrel assembly;

a slide barrel engaged with the holding frame; and at least one lens group received in the slide barrel, wherein the slide barrel can be slidable along a direction perpendicular to the optical axis during the retractable zoom lens retracting from the longest focal length position to the shortest focal length position.

2. The retractable zoom lens as claimed in claim 1, wherein the substrate comprises a flange defining a receiving groove at the center thereof for receiving an image pickup device thereon.

3. The retractable zoom lens as claimed in claim 1, wherein the substrate is integrally formed with the stationary barrel.

4. The retractable zoom lens as claimed in claim 1, wherein the substrate defines several screws for fixing the stationary barrel on the substrate by bolts.

5. The retractable zoom lens as claimed in claim 1, wherein an end of the leg portion is arc-shaped.

6. The retractable zoom lens as claimed in claim 1, wherein the movable barrel assembly comprises a first barrel defining a plurality of first through cam grooves and vertical grooves on the sidewall thereof and, a second barrel comprising a plurality of cam pins mating with the first through cam grooves respectively and defining a plurality of second cam grooves on the sidewall thereof, the second barrel rotated when the first barrel moving along the optical axis.

7. The retractable zoom lens as claimed in claim 6, wherein the holding frame comprises a base connected to the movable barrel assembly, a bracket engaged with the base, a pusher formed opposite to the leg portion and connecting to the bracket and an engaging pin engaged with the bracket and the pusher.

8. The retractable zoom lens as claimed in claim 7, wherein the base comprises a body, an arc-shaped sidewall extending from an edge of the body, and a slot formed between the body and the arc-shaped sidewall.

9. The retractable zoom lens as claimed in claim 8, wherein the sidewall defines a plurality of bars received in the vertical grooves and passed through the second cam grooves, when the second barrel rotates, the holding frame moves along the optical axis.

10. The retractable zoom lens as claimed in claim 8, wherein the body of the base defines a light hole at the center thereof, and a contacting surface facing the leg portion thereof defining a guiding groove along a radial direction of the base for guiding the slide barrel to move along the radial direction perpendicular to the optical axis.

11. The retractable zoom lens as claimed in claim 8, wherein the bracket comprises a supporting board, two legs extending downward from two opposite ends of the supporting board, and a projecting portion extending upward from the supporting board between the two legs.

12. The retractable zoom lens as claimed in claim 11, wherein the projecting portion defines a first positioning hole therein, the pusher defines a second positioning hole corresponding to the first positioning hole, the pusher is pivoted to the bracket with the engaging pin inserted through the first positioning hole and the second positioning hole.

13. The retractable zoom lens as claimed in claim 12, wherein the pusher comprises a claw-shaped body and a first ejector pin fixed on an end of the claw-shaped body, the second positioning hole defined on the claw-shaped body, and the leg portion resists against the first ejector pin when the retractable zoom lens retracts to the shortest focal length position.

14. The retractable zoom lens as claimed in claim 1, wherein the slide barrel comprises a first base portion and a first guiding shaft, the first base portion extending outward from the outer surface of the slide barrel, a pivot formed on a distal end of the first base portion and configured for receiving part of the first guiding shaft therein.

15. The retractable zoom lens as claimed in claim 14, wherein the axis of the pivot is substantially perpendicular to the axis of the slide barrel.

16. The retractable zoom lens as claimed in claim 14, wherein the pivot defines a second ejector pin extending outward from the outer surface thereof along a radial direction perpendicular to the optical axis of the retractable zoom lens, the pusher defines a cutout from an edge thereof, the second ejector pin received in the cutout and can be moved along the cutout.

17. The retractable zoom lens as claimed in claim 16, wherein the slide barrel further comprises a second base portion opposite to the first base portion with an arc-groove formed on a distal end thereof and a second guiding shaft engaged with the arc-groove.

18. The retractable zoom lens as claimed in claim 17, wherein the holding frame further comprises a protruding portion extending to the substrate and defining a first hole therein and a second opening corresponding to the first hole, the two ends of the second guiding shaft received in the first hole and the second opening.

19. The retractable zoom lens as claimed in claim 14, wherein the slide barrel further comprises a spring sleeved on the first guiding shaft.

20. The retractable zoom lens as claimed in claim 1, wherein the leg portion resists against part of the holding frame when the retractable zoom lens retracting to the shortest focal length position and then the slide barrel with the at least one lens group is slidable along a direction perpendicular to the optical axis.

* * * * *